Figure 1:
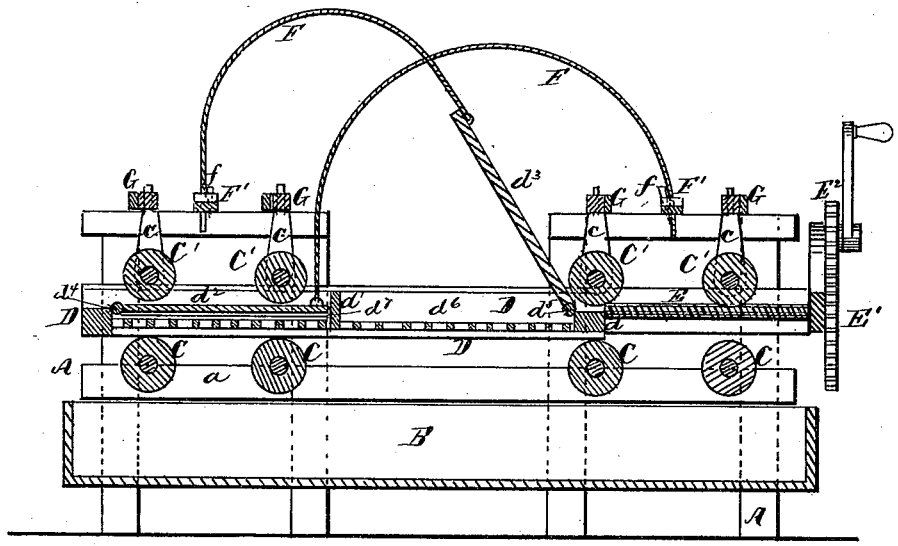
Figure 1:
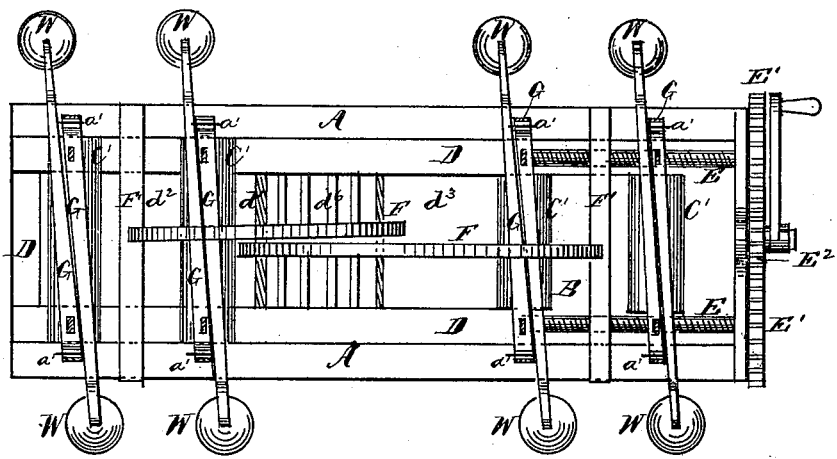

2 Sheets—Sheet 1.

J. NEARING.
WINE AND CIDER PRESS.

No. 178,321. Patented June 6, 1876.

Fig. II.

Witnesses:
Franklin Barnett
Richard Germer

Inventor:
Joe Nearing
Per Henry Germer,
Atty.

J. NEARING.
WINE AND CIDER PRESS.
No. 178,321.  Patented June 6, 1876.
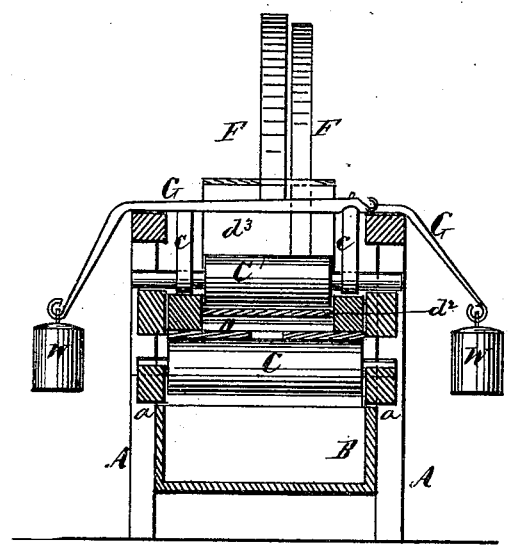
Fig. III.
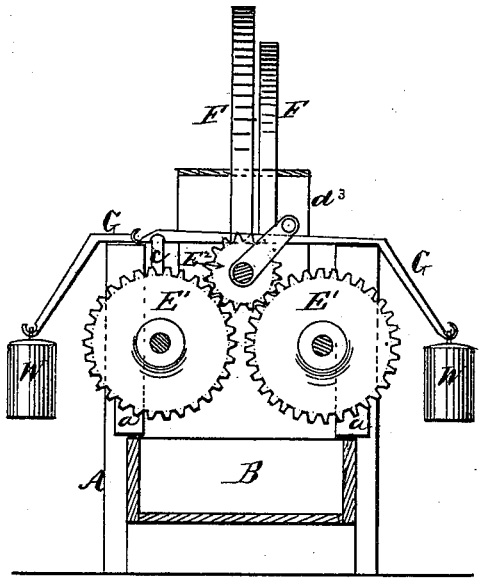
Fig. IV.
Witnesses:
Franklin Barrett
Richard Germer
Inventor:
Joe Nearing
Per Henry Germer, Atty.

UNITED STATES PATENT OFFICE.

JOE NEARING, OF SHERBURNE, NEW YORK.

IMPROVEMENT IN WINE AND CIDER PRESSES.

Specification forming part of Letters Patent No. 178,321, dated June 6, 1876; application filed February 23, 1876.

*To all whom it may concern:*

Be it known that I, JOE NEARING, of Sherburne, in the county of Chenango and State of New York, have invented a new and useful Improvement in Wine and Cider Presses, of which the following is the specification:

The object of this invention is to press the juice out of fruit for wine and cider making, in such a manner as to press the pomace dry, and at the same time to strain the liquid free from mechanical impurities or fine particles of pomace, and also to produce the desired pressure upon the pomace with the least expenditure of power.

The invention consists of a tray or box, in which the ground or bruised fruit to be operated on is placed on top of a cloth strainer, that overlies an open or perforated bottom. The tray or box is divided by a transverse partition into two compartments, each of which is covered by a top, hinged to the ends of the box. Each of the said tops or covers is opened from the box or tray automatically by a spring, as the box is moved to a position that frees the said covers from the pressure of a set of rollers which hold the covers down. The tray is given a longitudinal reciprocating motion by means of suitable machinery, hereinafter more fully described, and as it is moved back and forth the two ends or compartments of the fruit-tray pass between two sets of rollers, (one above and the other below the tray,) the upper rollers forcing down the covers to the tray on their respective ends as it is drawn under them, and the lower sets of rollers receiving the force of the pressure thus exerted. The upper set of rollers is allowed a slight vertical motion, so as to accommodate any required thickness of pomace in the fruit-tray, and they are held down to a uniform pressure upon the tray-covers by a set of weights placed upon their journal bearings.

The invention will be readily understood by reference to the accompanying drawings, of which—

Figure I is a longitudinal sectional elevation of the press, showing one tray-cover closed and one of them open. Fig. II is a general plan of the same. Fig. III is a transverse section taken on the line $x\,x$ of Fig. II. Fig. IV is an end elevation, showing the driving-gear.

The frame A supports the other parts of the press. The side beams $a$ provide bearings for the lower set of rollers, and below these pieces there is placed a tray or reservoir, B, into which the juice of the fruit is received as it drops from the press. The lower set of rollers C, which have their bearings in the side beams $a$, support the reciprocating tray D, and nuts $d$, fixed in the side pieces of this tray, are engaged by the threads of the two screws E, and by revolving these screws they are made to move the fruit-tray in either direction, just as the said screws may be turned. At the head end of the machine each of the screws E has a driving-wheel, $E^1$, which is geared into by the pinion $E^2$, so as to turn the two wheels $E^1$ and their respective screws simultaneously.

The reciprocating fruit-tray is divided, by the partition $d^1$, into two compartments, which are closed, respectively, by the covers $d^2$ and $d^3$. These covers are hinged to the sides of the tray by the rods $d^4$ and $d^5$, to which they are securely fastened at their outer ends, and the said rods are allowed a slight vertical play in their bearings in the sides of the tray, so as to accommodate different thicknesses of pomace beneath the covers. As the reciprocating tray is moved to either end of the frame it is drawn under a set of pressure-rollers, C', which force the covers $d^2$ and $d^3$ down upon the pomace. These covers, when they are released from the pressure of the rollers C', as is clearly shown in the case of the cover $d^3$ in Fig. I, are thrown up by the action of one of the springs F, that is fastened to the free end of the cover. In this position the prepared or ground fruit may be thrown into the reciprocating tray, and scattered upon its perforated or open bottom $d^6$, over which is placed a strainer-cloth, $d^7$. The rollers C' have their bearings in the adjusting-blocks $c$, to the top ends of which are attached the levers G. These levers are fulcrumed at $a'$ to the frame A, and on their outer or free ends carry the weights $w$, by means of which the desired downward pressure is produced upon the bearings of the rollers C', and so upon the rollers themselves. The springs F are attached to cross-beams F', fixed to the top part of the frame A, by passing through vertical mortises in the said beams, and secured in place in said mortises by the wedge-keys $f$. These springs may be adjusted to the rigidity required by loosening the wedges $f$, and then moving the spring up or down, as required, and tightening the key.

The rollers C and C' are made in pairs, with the upper roller vertically over the lower roller, so as to press the contents of the tray with great force between the two sets of rollers. As the tray is moved toward either end of the frame A, the cover $d^2$ or $d^3$, as the case may be, is drawn under the top rollers C' with a gradual movement, so as to produce a progressive pressure upon the pomace.

Having thus described my invention, I desire to claim—

1. The reciprocating fruit-tray D, having hinged covers $d^2$ and $d^3$, and arranged to pass between pressure-rollers C and C', in such a manner as to force the said covers $d^2$ and $d^3$ gradually down upon the pomace in the tray and press the juices therefrom, substantially as and for the purpose set forth.

2. The reciprocating tray D and its operating-screws E, with their fixed nuts $d$, combined and operated in the manner and for the purpose set forth.

3. The springs F, arranged to open the covers $d^2$ and $d^3$, substantially as and for the purpose set forth.

4. The springs F, with their adjustable connections $f$ F', as and for the purpose set forth.

5. The adjustable pressure-rollers C', arranged to press with uniform force and at variable heights upon the moving covers $d^2$ $d^3$, as and for the purpose set forth.

JOE NEARING.

Witnesses:
ELI E. ROWLAND,
GEORGE KAHN.